US009553296B1

United States Patent
Dai et al.

(10) Patent No.: US 9,553,296 B1
(45) Date of Patent: Jan. 24, 2017

(54) MAGNETIC PULSE WELDING IN MEDICAL POWER MANUFACTURING

(71) Applicant: Greatbatch Ltd., Clarence, NY (US)

(72) Inventors: Xiangyang Dai, East Amherst, NY (US); Gary Freitag, East Aurora, NY (US)

(73) Assignee: Greatbatch Ltd., Clarence, NY (US)

( * ) Notice: Subject to any disclaimer, the term of this patent is extended or adjusted under 35 U.S.C. 154(b) by 484 days.

(21) Appl. No.: 13/850,032

(22) Filed: Mar. 25, 2013

Related U.S. Application Data

(60) Provisional application No. 61/614,652, filed on Mar. 23, 2012.

(51) Int. Cl.
| | | |
|---|---|---|
| *H01M 2/20* | (2006.01) | |
| *H01M 2/22* | (2006.01) | |
| *B23K 20/06* | (2006.01) | |
| *H01M 2/06* | (2006.01) | |

(52) U.S. Cl.
CPC ............... *H01M 2/22* (2013.01); *B23K 20/06* (2013.01); *H01M 2/06* (2013.01)

(58) Field of Classification Search
CPC ............ H01M 2/22; H01M 2/06; B23K 20/06
USPC ........................................ 429/177; 29/623.1
See application file for complete search history.

(56) References Cited

U.S. PATENT DOCUMENTS

| | | | |
|---|---|---|---|
| 6,400,538 B1 | 6/2002 | Kistersky et al. | |
| 6,908,023 B2 | 6/2005 | Yablochnikov | |
| 6,921,444 B2 | 7/2005 | Joaquin et al. | |
| 6,927,370 B2 | 8/2005 | McClure et al. | |
| 7,127,816 B2 | 10/2006 | Kiehl | |
| 7,256,373 B2 | 8/2007 | Gafri et al. | |
| 7,364,062 B2 | 4/2008 | Moore | |
| 7,395,597 B2 | 7/2008 | Shao et al. | |
| 7,514,819 B2 | 4/2009 | Kichline, Jr. | |
| 2004/0191621 A1* | 9/2004 | Heller, Jr. | 429/181 |
| 2005/0228469 A1* | 10/2005 | Zarembo et al. | 607/122 |
| 2007/0191929 A1 | 8/2007 | Osborne et al. | |
| 2008/0039845 A1 | 2/2008 | Bonutti et al. | |
| 2010/0198336 A1 | 8/2010 | Weber et al. | |
| 2011/0248585 A1 | 10/2011 | Wang et al. | |

OTHER PUBLICATIONS

Aizawa, T., Application of Magnetic Pulse Welding for Aluminum Alloys and SPCC Steel Sheet Joints, Welding Journal, May 2007, vol. 86, 119-s-124-s.
Aizawa, T. and Kashani, M., Magnetic Pulse Welding (MPW) Method for Dissimilar Sheet Metal Joints, 1-8, Tokyo, Japan.
(Continued)

*Primary Examiner* — Karie O'Neill Apicella
(74) *Attorney, Agent, or Firm* — Steven W. Winn; Michael F. Scalise

(57) ABSTRACT

A magnetic pulse welding process for joining a current collector to a terminal pin in the construction of electrochemical cells is described. The magnetic pulse welding process utilizes a pulsed direct current and an electrically conductive coil to generate an electro-magnetic force that causes two work pieces to collide with each other and form a bond therebetween. Preferably, the method is used to bond the terminal pin to the cathode current collector. This method of attachment is suitable for either primary or secondary cells, particularly those powering implantable biomedical devices.

32 Claims, 13 Drawing Sheets

(56) References Cited

OTHER PUBLICATIONS

Kashani, M., MPW Technique, 2007.
Watanabe, M. and Kumai, S., Interfacial Morphology of Magnetic Pulse Welded Aluminum/Aluminum and Copper/Copper Lap Joints, Materials Transactions, 2009, 286-292, vol. 50, Yokohama, Japan.

* cited by examiner

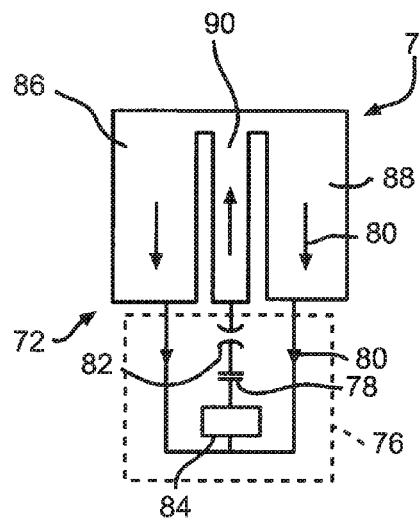
FIG. 9A
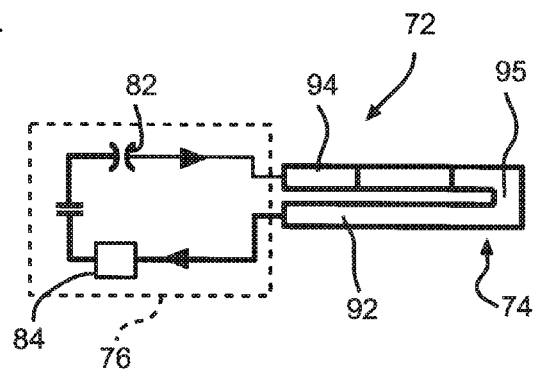
FIG. 9B
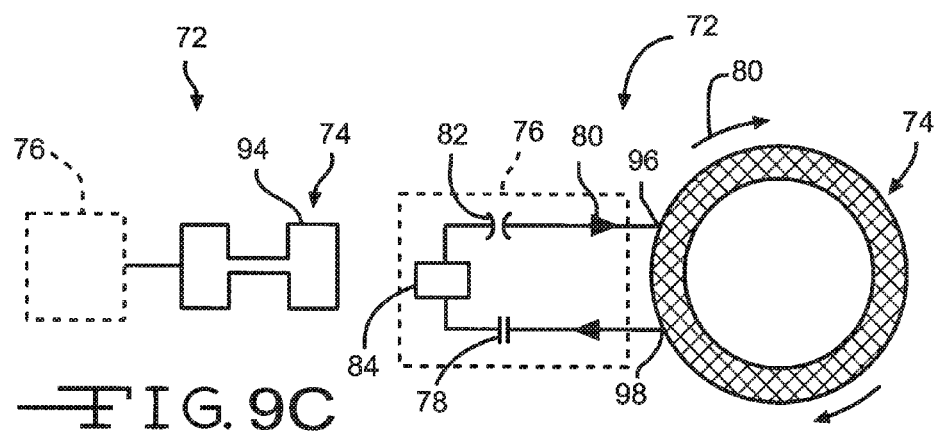
FIG. 9C
FIG. 9D

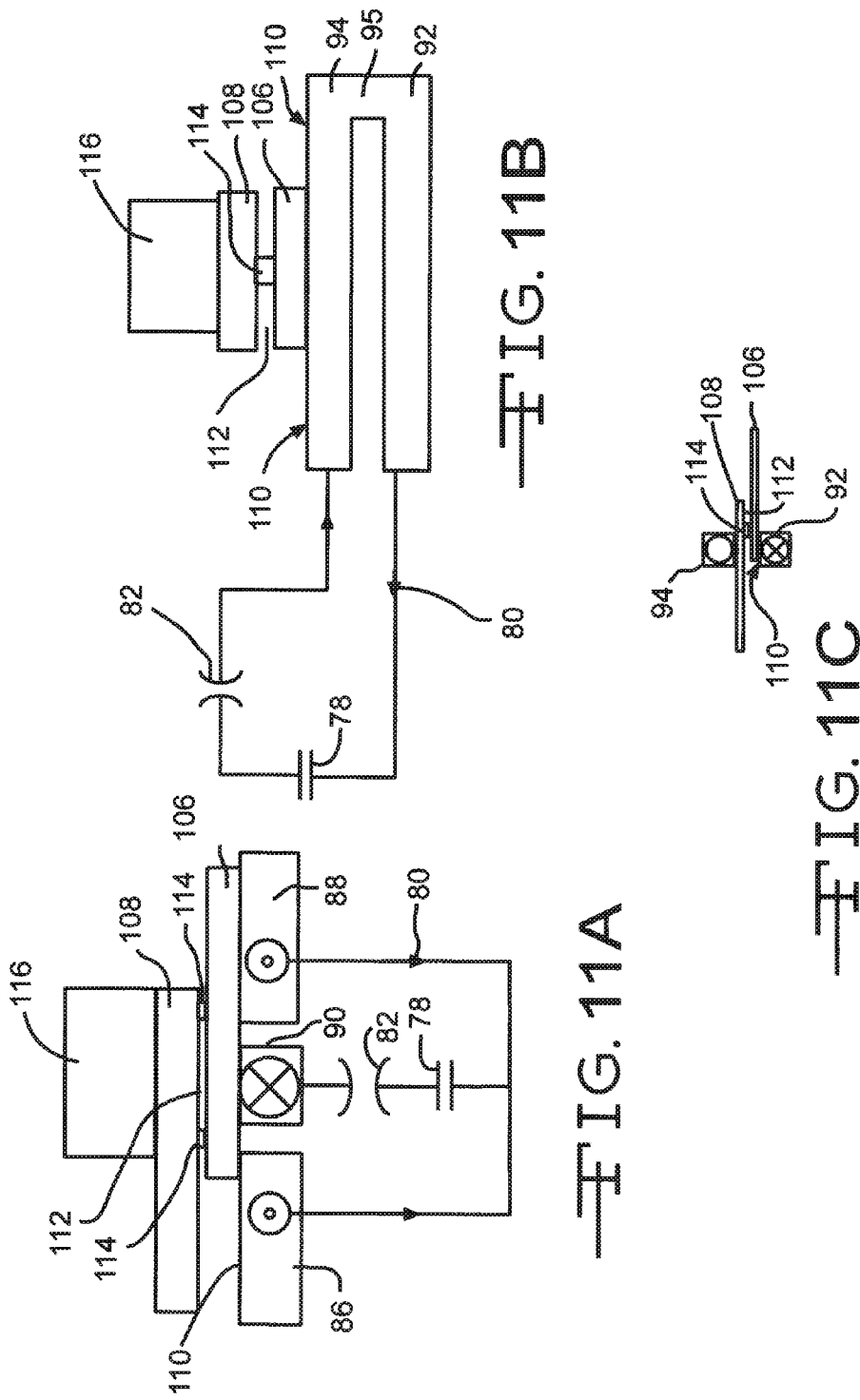

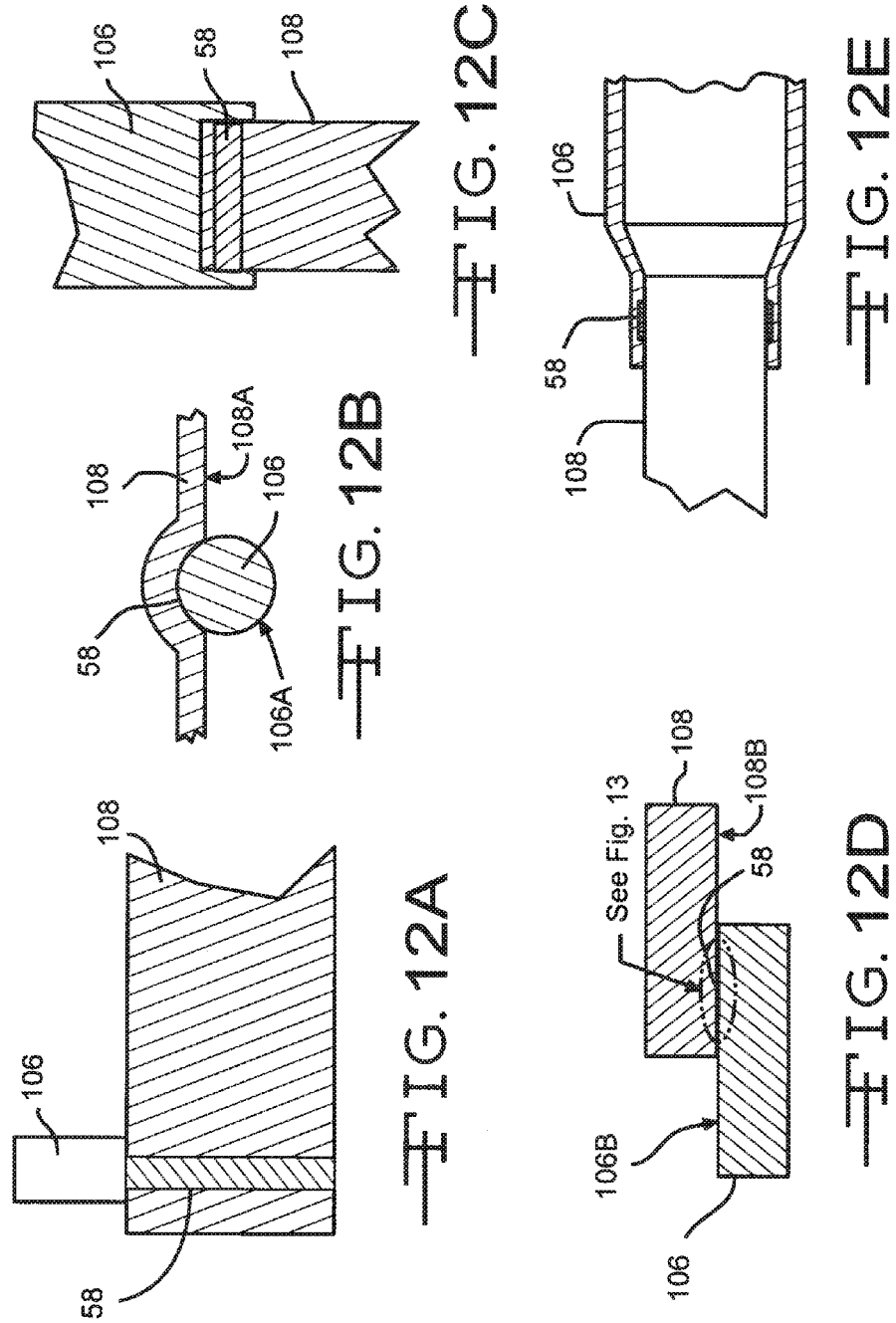

MAGNETIC PULSE WELDING IN MEDICAL POWER MANUFACTURING

CROSS-REFERENCE TO RELATED APPLICATION

This application claims priority from U.S. Provisional Patent Application Ser. No. 61/614,652, filed Mar. 23, 2012.

FIELD OF THE INVENTION

The present invention relates to the art of electrochemical cells, and more particularly, to an improved method of connecting a current collector to a terminal pin. The present invention is of a magnetic pulse welding method by which the terminal pin is directly connected to the current collector.

PRIOR ART

The recent rapid development in small-sized electronic devices having various shape and size requirements requires comparably small-sized electrochemical cells of different designs that can be easily manufactured and used in these electronic devices. Preferably, the electrochemical cell has a high energy density, and one commonly used cell configuration is a prismatic, case-negative cell design having an intermediate cathode flanked by opposed anode components in contact with the casing and in electrical association with the cathode.

The diverse variety of materials used in the construction of electrochemical cells increases the difficulty of assembling and manufacturing such small intricate devices. It is desirable to build such electrochemical cells with simplified procedures that create an electrochemical cell with a durable and robust construction. Such electrochemical cells require joining various internal components, composed of differing materials, with a strong durable bond. One of these critical connections is that of the terminal pin to the current collector. The terminal pin connects the electrochemical cell's internal current collector to a load such as an implantable medical device.

However, because of the diverse materials with their respective distinct material properties, it is sometimes difficult to join and bond these components together. Typical bonding techniques, such as standard laser and resistance welding practices, are not always ideal in joining components such as terminal pin and current collector materials.

Specifically with respect to the electrochemical cell, joining the terminal pin, typically composed of molybdenum, to that of the current collector, typically composed of aluminum or titanium, has been historically problematic. Previously, intermediate materials and processes have been used to accomplish the joining and bonding of these components made of diverse materials. These intermediate materials and processes add undesirable cost and complexity to the construction of electrochemical cells. Furthermore, such intermediate materials and processes can create brittle bonds that may not be sufficiently robust.

Moreover, the use of laser welding is not ideal. Laser welding typically requires that a cavity be burned into a first material, such as a terminal pin. This cavity is then filled with a second material which creates a metallurgical bond. Such a cavity decreases the cross sectional area of the terminal pin thereby decreasing its strength and possibly creating a brittle bond. Furthermore, laser welding requires exacting precision in bonding the materials together, which adds manufacturing complexity.

In addition, other welding techniques such as resistance welding rely on the application of heat creating a diffused intermetallic bond within a heat affected zone. The creation of such an intermetallic bond through the formation of a heat affected zone, may not be possible given the distinctive compositions of the work pieces. Furthermore, the joining of such materials through the formation of a heat affected zone, may create an undesirable brittle bond.

The present invention provides an improved means of joining dissimilar materials. More specifically, the present welding method enables an improved joining of different materials that are utilized in the manufacture of electrochemical cells. The present invention eliminates the need for intermediate materials as well as the previously described laser welding processes. Such a direct weld procedure reduces cost, complexity and creates a more robust connection. The magnetic pulse welding process of the present invention is fast, simple, easy to control and effective.

SUMMARY OF THE INVENTION

The present invention relates to a method of connecting an electrode current collector, particularly the tab of the current collector, to a terminal pin. Such a configuration forms a direct connection of the terminal pin to the current collector at the tab to provide an electrical connection therebetween. The present invention further relates to a method of connecting the terminal pin to the current collector of different material compositions, geometries and configurations. The present invention is a method of using a magnetic pulse welding process to form a direct connection between the terminal pin and current collector.

In this magnetic pulse welding method, two dissimilar materials, particularly of significantly dissimilar melting temperatures, are joined together in a strong bond. In that respect, the present invention comprises a method by which materials having dissimilar melting temperatures are directly joined by the application of an electro-magnetic force over a short duration of time. Magnetic pulse welding works by generating an electro-magnetic force that physically drives a first material into a second material such that they collide together. The impaction force generated during the collision of the two materials is of enough energy that the two materials become permanently joined together.

A magnetic pulse welding instrument generally comprises a power source, an electrical current switching or pulsing system and a coil structure. The coil, generally comprised of a metallic material, induces a magnetic field about the exterior surface of the coil when an electrical current is applied by the power source. Interaction of the work piece(s) with the magnetic field ultimately induce an electro-magnetic force which enables creation of the weld joint.

In a typical magnetic pulse welding process, work pieces to be joined are first inserted within or are placed adjacent to the coil structure. A pulsating direct electric current is applied to the metallic coil at a relatively high pulsing rate. Application of the pulsing direct electric current to the coil generates a magnetic field flux around the exterior surface of the coil or portion thereof. The magnetic field flux, in the presence of the work piece(s), induces an eddy current within the surface of the work piece(s). The eddy current within the work piece opposes the magnetic field, and a repulsive electro-magnetic force, acting perpendicularly away from the magnetic field, is created. This electro-magnetic force drives the work pieces together at a high rate of speed, thereby creating an impact type weld at the collision site.

Creation of the electro-magnetic force is generally described by John Fleming's left-hand rule which states that the interaction of a magnetic field flux (B) and an eddy current (i) creates a electro-magnetic force acting away and perpendicularly from the magnetic field. This electro-magnetic force physically moves a first material, positioned proximal to an energized portion of the coil, into a second material at a high rate of speed. The force of the impaction of the two materials thereby creates a permanent bond therebetween in the order of micro seconds.

Thus, the magnetic pulse welding process is capable of joining metals of dissimilar composition, melting temperature, and/or mechanical properties. Unlike laser and resistance welding, magnetic pulse welding is considered to be a solid state joining process. Direct application of heat, such as through a laser beam or electrical resistance, is not used in magnetic pulse welding. As a result, a heat affected zone at the intersection of two materials is not formed and thus formation of intermetallic bonds is minimized. Bonding during magnetic pulse welding occurs in a fraction of a second, thereby minimizing extensive inter diffusion of materials as is typically the case with other welding techniques. Such intermetallic bonds, particularly those formed within heat affected zones, typically exhibit poor durability and are, therefore, not generally desired for use in an electrochemical cell. Furthermore, because of dissimilarities in composition, not all metals are capable of being joined by laser and resistive welding techniques. In either case, the combination of possible joined materials is limited when utilizing joining techniques such as laser and resistive welding.

In a preferred embodiment, a molybdenum terminal pin is directly joined to an aluminum current collector. Generally, a current collector is in electrical contact with the active material that comprises the anode, the active material that comprises the cathode, or both. The terminal pin may be joined to a single anode or cathode current collector or to multiple anode and cathode current collectors, depending on the specific design and application requirements of the electrochemical cell. The present invention can also be utilized in a variety of rechargeable or non-rechargeable electrochemical cell designs and chemistries. That is in both case negative and case positive designs as the negative terminal. In a case negative design, the anode is connected to the casing as the positive terminal. Alternatively, in a case positive design, the cathode is connected to the casing.

Furthermore, the welding process of the present invention is not limited to the connection of a molybdenum terminal pin to an aluminum current collector. Such a welding process can also be used to directly bond a series of metals of dissimilar melting temperatures, preferably metals in which their respective melting temperatures vary significantly. Furthermore, the welding process of the present invention is not limited to a specific geometry. The material to be welded may be of a plurality of geometries such as, but not limited to, a rectangular form, a curved body or a multi-sided polygon shape.

Thus, the present invention overcomes many inherent difficulties in constructing an electrochemical cell. The present invention increases the cell design capabilities by allowing the terminal pin to directly join to a wide variety of metals of differing melting temperatures that were previously not capable of being bonded together with a resistance or a laser weld process. The present invention reduces manufacturing cost and reduces construction complexity. The present invention also allows for the utilization of different cell chemistries requiring the use of different current collector materials that would not normally allow for a direct connection with the terminal pin.

BRIEF DESCRIPTION OF THE DRAWINGS

FIG. 9A illustrates a top view of an embodiment of an electrical schematic of a magnetic pulse welding instrument comprising a single layer "E" shaped magnetic pulse weld coil.

FIG. 9B is a side view of an embodiment of an electrical schematic of a magnetic pulse welding instrument comprising a double layer "H" shaped magnetic pulse weld coil.

FIG. 9C illustrates a top view of the electrical schematic of the magnetic pulse welding instrument shown in FIG. 9B.

FIG. 9D shows a top view of an embodiment of a magnetic pulse welding instrument comprising a cylindrically shaped coil.

FIG. 11A illustrates a side view of an embodiment of a setup of the magnetic pulse welding instrument shown in FIG. 9A with two work pieces.

FIG. 11B illustrates a side view of an embodiment of a setup of the magnetic pulse welding instrument shown in FIG. 9B with two work pieces.

FIG. 11C illustrates a cross-section view taken from the side of an alternate embodiment of a setup of a magnetic pulse welding instrument comprising a double layer "H" shaped magnetic pulse weld coil with two work pieces positioned between the coil layers.

FIG. 12A illustrates a magnified side view of an embodiment of a first metal 106 having a curved cross-section joined to a second metal 108 having a rectangular cross-section using the present magnetic pulse welding invention.

FIG. 12B shows a magnified top view of the pulse weld connection shown in FIG. 12A.

FIG. 12C illustrates a magnified top view of an embodiment of a first and second metal 106, 108, each comprising a rectangular cross-section, joined using the present magnetic pulse welding invention.

FIG. 12D shows a magnified cross-sectional view of the embodiment shown in FIG. 12C.

FIG. 12E illustrates a magnified cross-sectional view of a first metal comprising a tubular form and having a frusto-conical end connected to a second metal comprising a curved cross-section using the present magnetic pulse welding invention.

DETAILED DESCRIPTION OF THE PREFERRED EMBODIMENTS

Figure 1:
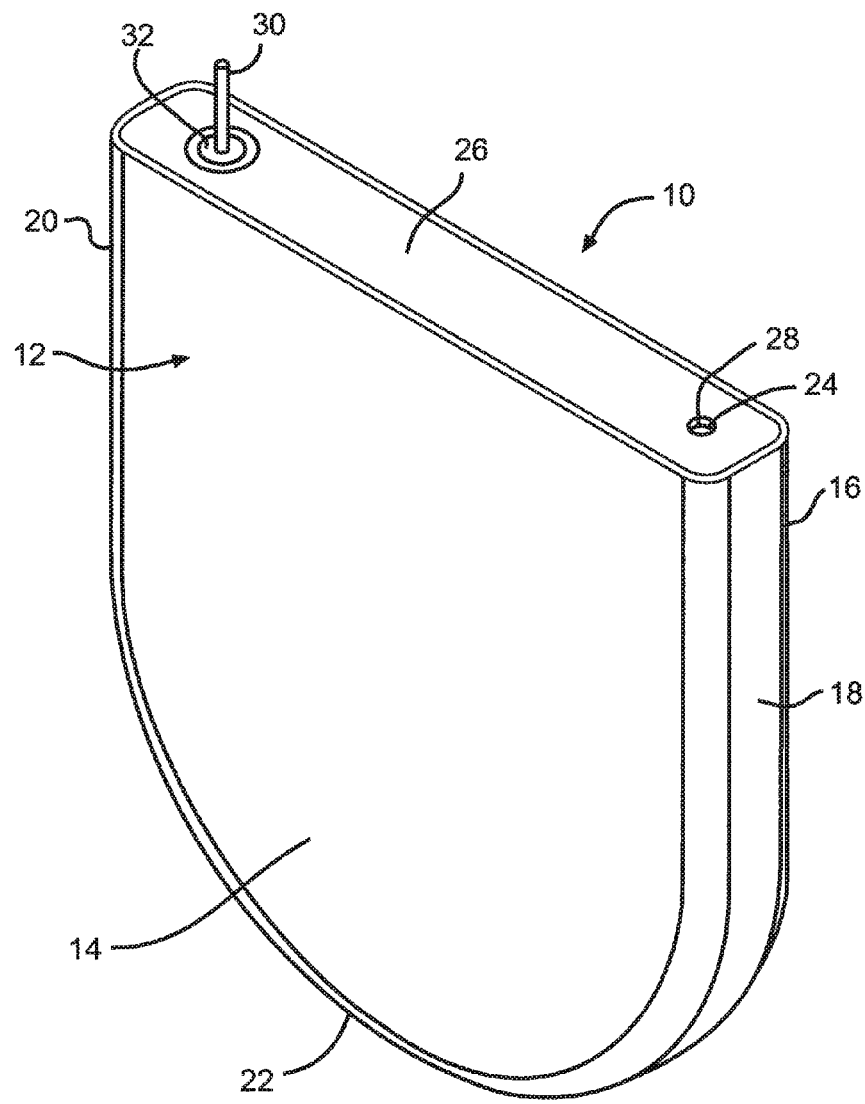
FIG. 1 is a perspective view of an electrochemical cell 10.
Figure 2:
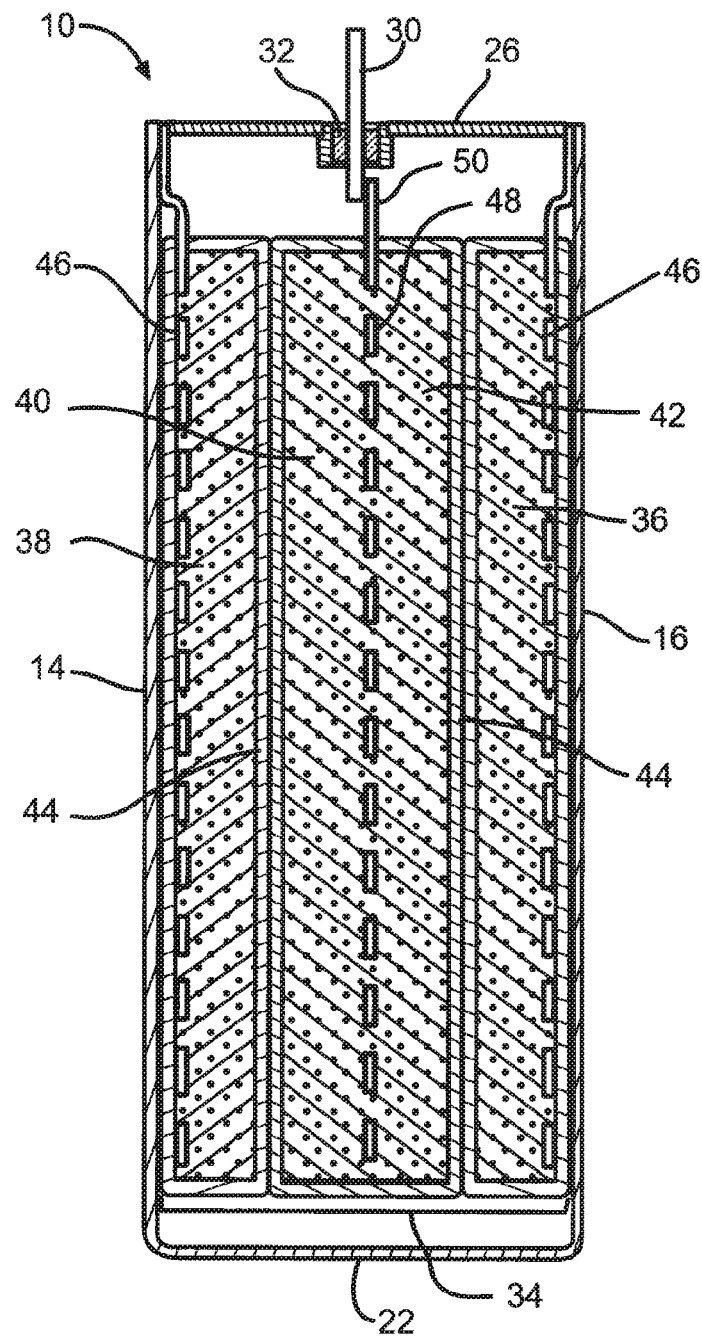
FIG. 2 is a cross-sectional view taken from the side illustrating an embodiment of the direct connection of the terminal pin 30 to the current collector 48 of the present invention.

Referring now to FIGS. 1 and 2, there is shown an electrochemical cell 10 comprising a casing 12 having spaced-apart front and back walls 14 and 16 joined by curved end walls 18 and 20 and a curved bottom wall 22. The end walls can be curved to provide the casing having an oval cross-section, or they can be generally planar to provide a rectangular or prismatic cross-section. The casing has an opening 24 provided in a lid 26 used for filling the casing 12 with an electrolyte after the cell components have been assembled therein and lid 26 has been welded to casing 12. In its fully assembled condition shown in FIG. 1, a closure means 28 is hermetically sealed in opening 24 to close the cell. A terminal pin 30 is electrically insulated from lid 26 and casing 12 by a glass-to metal seal 32, as is well known to those skilled in the art.

Cell 10 comprises an electrode assembly 34 (FIG. 2) that further comprises anode electrode components 36, 38 and cathode electrode components 40, 42 prevented from contacting each other by a separator membrane 44. The anode electrode components 36, 38 are composed of an anode active material supported on an anode current collector 46. The cathode electrode components 40, 42 are composed of an active cathode material that is supported on a cathode current collector 48. As shown in FIG. 2, the cathode current collector 48 may comprise a tab 50 that extends outwardly therefrom.

The embodiment shown in FIG. 1 is commonly referred to in the art as a case negative cell. Case negative electrochemical cells are constructed with anode electrode components 36, 38 that are electrically connected to casing 12 via the anode current collector 46 while the cathode electrode components 40, 42 are electrically connected to the terminal pin 30 via the cathode current collector 48. Alternatively, a case positive cell design may be constructed by reversing the connections. In other words, terminal pin 30 is connected to the anode electrode components 36, 38 via the anode current collector 46 and the cathode electrode components 40, 42 are connected to the casing 12 via the cathode current collector 48.

Both anode current collector 46 and the cathode current collector 48 are composed of an electrically conductive material. It should be noted that the electrochemical cell 10 of the present invention as illustrated in FIGS. 1 and 2 can be of either a rechargeable (secondary) or non-rechargeable (primary) chemistry of a case negative or case positive design. The specific geometry and chemistry of the electrochemical cell 10 can be of a wide variety that meets the requirements of a particular primary and/or secondary cell application.

As shown in FIG. 2, the cathode current collector 48 of the present invention generally comprises a screen 52, an internal connection tab 54 in the form of a land that is co-planar with and surrounded by screen 52, and an integral external connection tab 56. Screen, as pertains to the present invention, is defined herein as a surface on which cathode or anode active material is deposited. A screen may be comprised of a foil having a solid surface or of a mesh or grid having a series of perforations throughout its surface.

Anode current collector 46 of the present invention, similarly to the cathode current collector 48, also generally comprises a screen 52, an internal connection tab 54 in the form of a land that is co-planar with and surrounded by screen 52, and an integral external connection tab 56.

In a first embodiment of the present invention, external connection tab 56, of either an anode current collector 46 or cathode current collector 48, is an outwardly extending continuation of internal tab 54. External tab 56 may not necessarily be coplanar with internal connection tab 54 and screen 52. External tab 56 may be of an extended, elongated strip of metal such as in a ribbon or coil form, which may not be coplanar with either.

Figure 3:
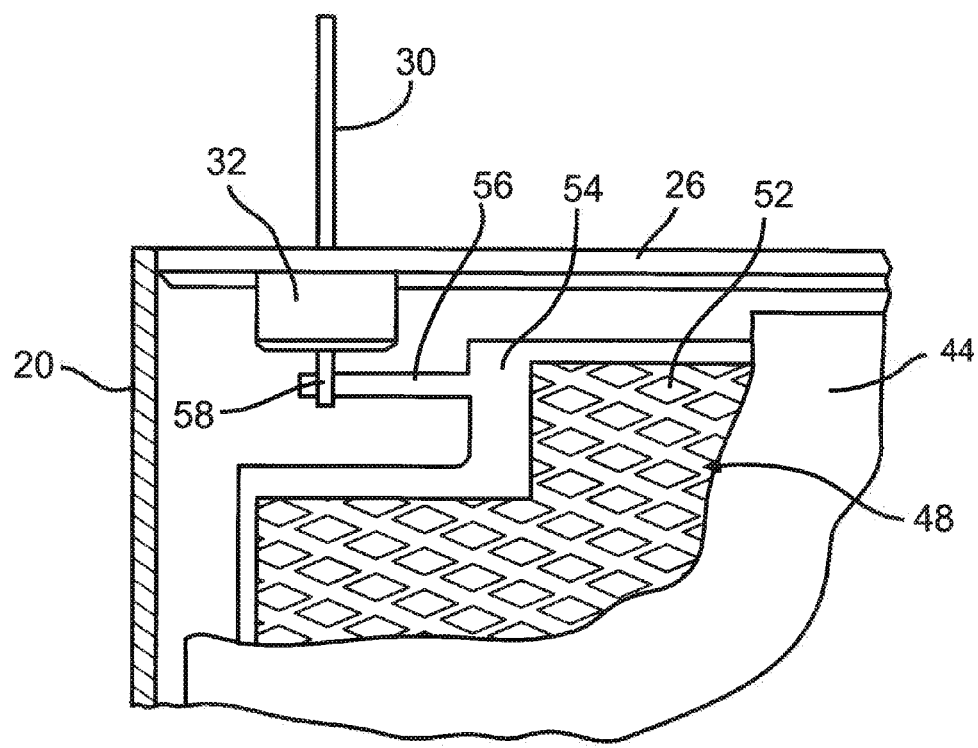
FIG. 3 is a cross-sectional view taken from the side depicting an embodiment of the direct connection of the terminal pin 30 to the current collector 48 of the present invention.

As shown in FIG. 3, weld area 58 is where two metals meet and are joined together. The weld area 58 may comprise the location in which two metals of similar or dissimilar composition are joined together. The weld area 58 may further comprise the location where terminal pin 30 is joined to a region of the current collector 46, 48 such as the external tab 56. Thus, depending on the desired position of terminal pin 30 in cell 10, connection tabs 54 and 56 can be of various lengths or shapes to provide additional flexibility in joining the terminal pin 30 to the current collector 48.

For example, if the design of the cell 10 requires terminal pin 30 to be positioned closer to or farther away from the center of lid 26, the current collector 48 of the present invention easily accommodates the design changes without having to be changed itself. Terminal pin 30 is simply joined to a different contact point on either the internal connection tab 54 or the external connection tab 56. Terminal pin 30 may also be joined directly to the current collector screen 52. Of course, there may be cell constructions where it is desirable to connect terminal pin 30 to multiple locations along the current collector 48. Such locations may include but are not limited to, the internal tab 54, the external tab 56 and the current collector screen 52. In addition, multiple current collector tabs 56 may be connected to terminal pin 30.

It will be apparent to those skilled in the art that terminal pin 30 can be directly joined to the current collector 48 at any contact point along the extent of the internal tab 54 and the external tab 56 by using the present magnetic pulse welding procedure. It will also be apparent to those skilled in the art that terminal pin 30 may be joined at any point along the anode or cathode current collector 46, 48.

FIG. 3 illustrates a case negative embodiment in which cathode current collector 48 is directly joined to terminal pin 30. It is contemplated that anode current collector 46 could be substituted for cathode current collector 48 creating a case positive cell design. Such an embodiment is illustrated in FIG. 6 in which the terminal pin 30 is directly joined to either the anode or cathode current collector 46, 48.

Figure 4:
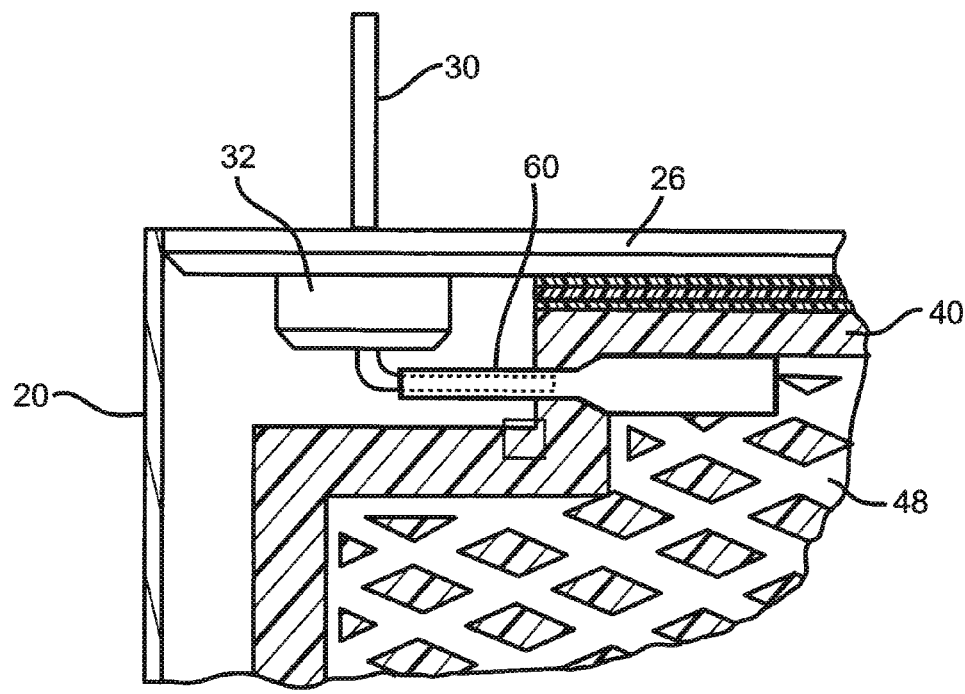
FIG. 4 is a cross-sectional view illustrating an embodiment of a coupler 60 connecting the terminal pin 30 to the current collector 48 using the present magnetic pulse welding invention.
Figure 5:
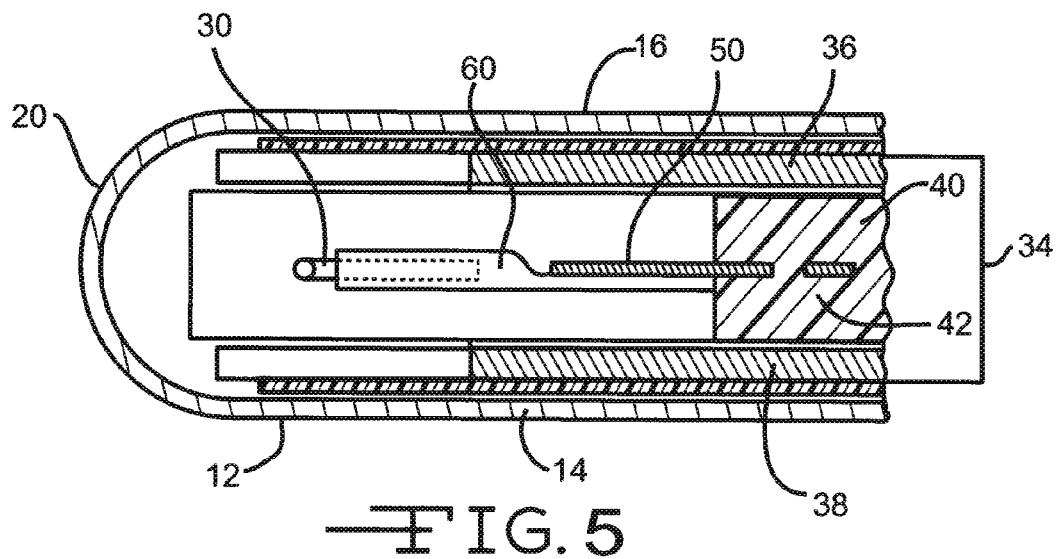
FIG. 5 is a cross-sectional view taken from the top showing the coupler 60 connecting the terminal pin 30 to the current collector 48.

FIGS. 4 and 5 illustrate an additional embodiment of joining dissimilar metals in an electrochemical cell 10 through the use of magnetic pulse welding. In this embodiment, a coupler 60 is used to join different metals together. As illustrated, the coupler 60 bridges the two dissimilar materials of the terminal pin 30 together with the cathode current collector 48. The coupler 60 comprises an inlet that receives the proximal end of the termination pin 30 while an opposite distal end of the coupler 60 generally comprises a planar end on to which a current collector tab 50 may be connected. In this embodiment, the terminal pin 30 is welded within the inlet portion of the coupler 60 and the current collector tab 50 is welded to the planar distal portion of the coupler 60. In this case, magnetic pulse welded joints form the respective connections. The coupler 60 may not only bridge the connection between two dissimilar materials but may also act as an extension between two materials in which there is a gap of space that prohibits direct bonding of the materials.

Figure 6:
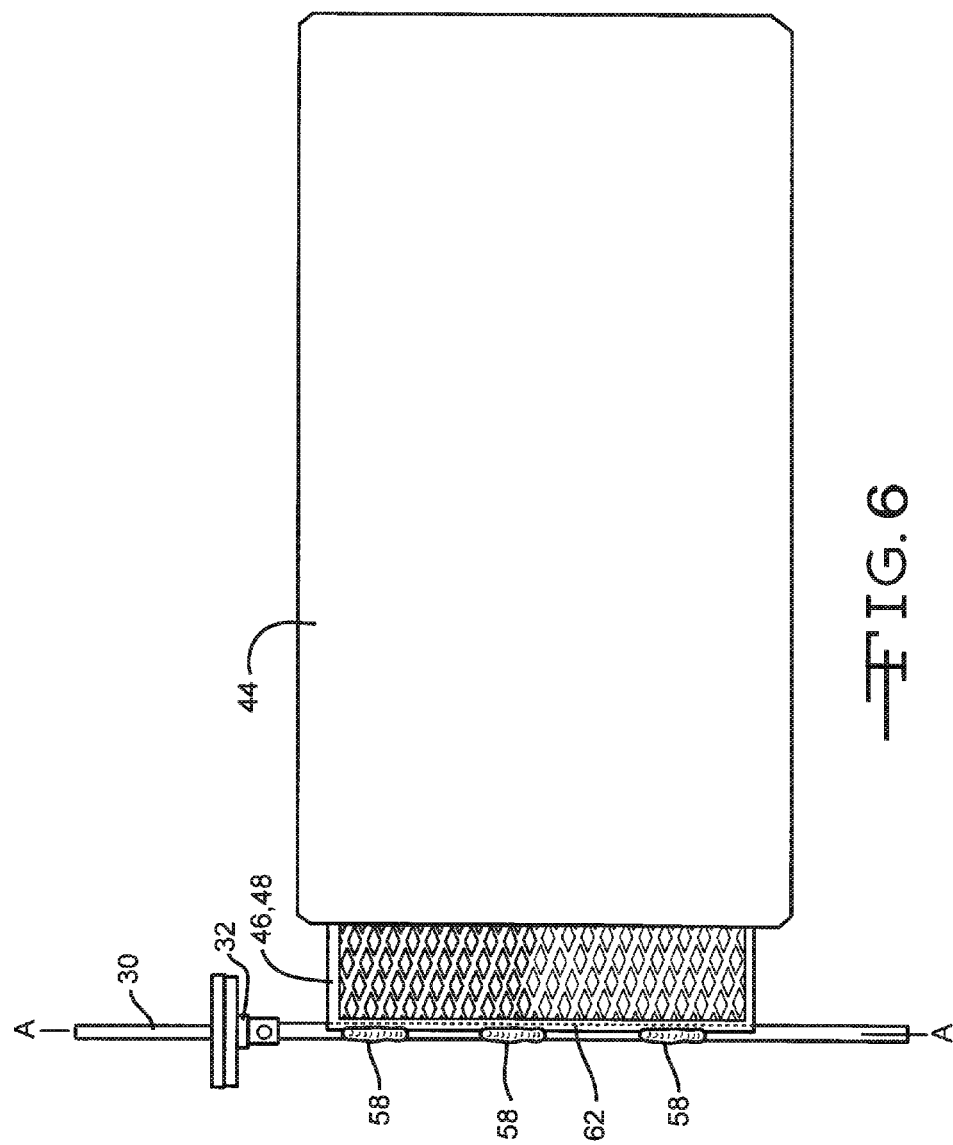
FIG. 6 is a perspective view of the direct connection of the terminal pin 30 to the side edge 62 of the current collector 46, 48 using the present magnetic pulse welding invention.

FIG. 6 illustrates an embodiment in which a side edge 62 of a current collector screen 52 is joined to the surface of the terminal pin 30 along vertical axis A-A using the present magnetic pulse welding method. It is contemplated that terminal pin 30 is not necessarily limited to being joined at the end of side edge 62 as depicted in FIG. 6. Terminal pin 30 may be joined distal of side edge 62 along any portion of the screen 52 surface. It is further contemplated that the coupler 60 may be connected external of the cell 10. In this case, the coupler 60 is joined to the distal end of the terminal pin 30.

As illustrated in FIG. 6, the joining of terminal pin 30 to the side edge 62 may comprise multiple discrete weld areas 58 or a single weld area 58 that extends along the entire length of side edge 62 of either an anode or cathode current collector 46, 48. Such an anode or cathode current collector 46, 48 may be incorporated with an anode active material or cathode active material of the respective current collector 46, 48. It is contemplated that the embodiment shown in FIG. 6 would be useful in constructing electrochemical cells 10 of small compact sizes, such as in a "jelly roll" design (not shown). In a "jelly roll" design, a single or multiple current collectors 46, 48 are wound around a central vertical axis A-A of the terminal pin 30. The jelly roll design thus enables a small round compact electrochemical design.

Figure 7:
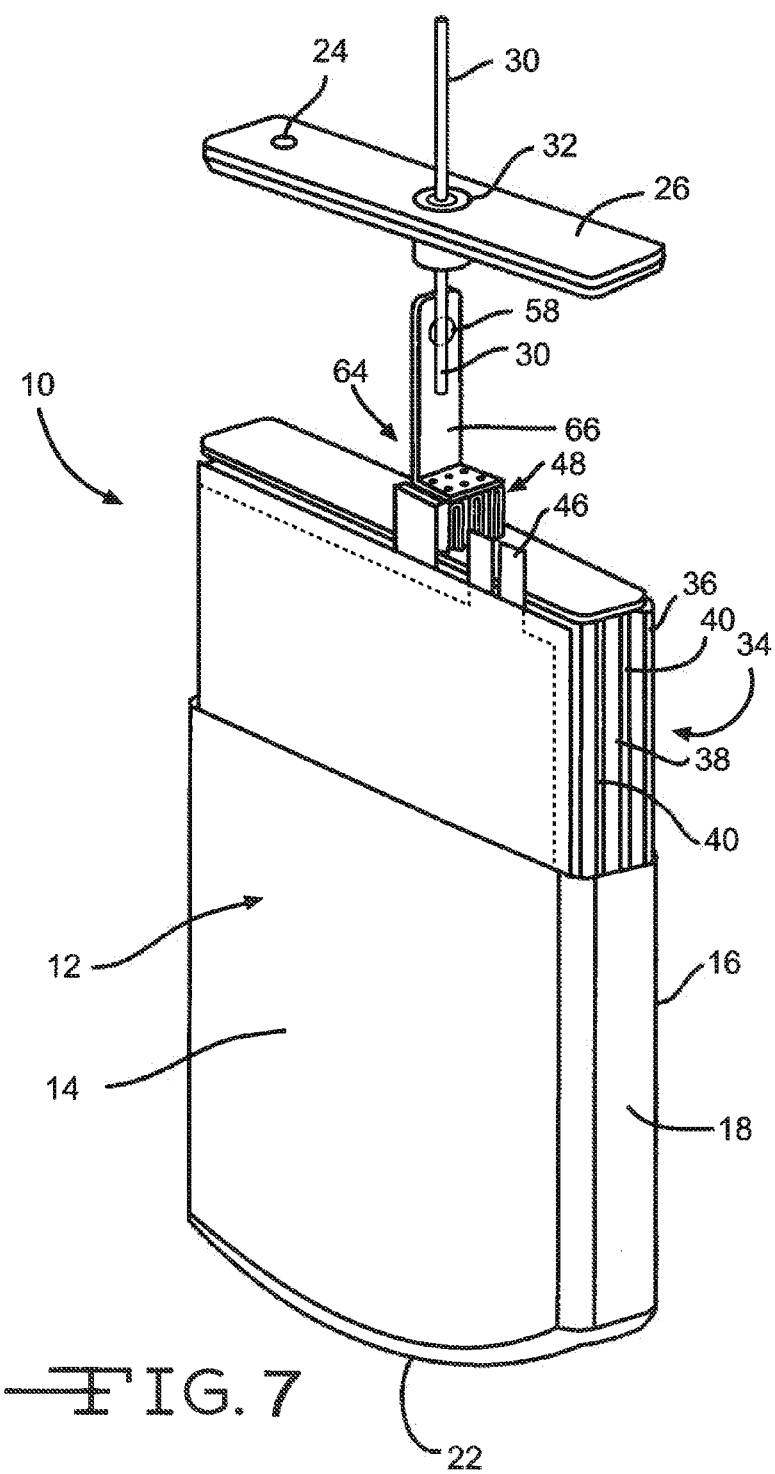
FIG. 7 is a perspective view of an embodiment of an electrochemical cell 10 illustrating the terminal pin 30 joined to a series of current collectors 48.

In an alternate embodiment, terminal pin 30 may be connected to multiple anode and cathode current collectors 46, 48 as illustrated in FIG. 7. FIG. 7 shows an embodiment illustrating electrode assembly 34 comprised of multiple cathode electrode components 40, 42 and anode electrode components 36, 38. As illustrated in FIG. 7, cathode electrode components 40, 42 and anode electrode components 36, 38 are proximate each other in an interleaved, alternating manner.

In the alternate embodiment shown in FIG. 7, the interleaved electrode assembly 34 is constructed by alternating cathode electrode components 40, 42 with that of anode electrode components 36, 38. Each of these cathode electrode components 40, 42 and anode electrode components 36, 38 are incorporated with their respective current collectors 46, 48 with an external tab 56 (FIG. 3) that extends outside each collector 46, 48.

As illustrated in the embodiment shown in FIG. 7, a bridge 64 is formed from external connection tabs 56 of cathode current collectors 48. Bridge 64 of the illustrated embodiment is comprised of portions of electrically conductive external tabs 56 of cathode current collectors 48 that are folded over each other establishing electrical connection therebetween amongst the plurality of cathode current collectors 48. The associated anode current collectors 46 are electrically connected to casing 12. Therefore the illustrated embodiment, as shown in FIG. 7, is of a case negative cell design. An alternatively preferred embodiment is of a case positive design. In the contemplated case positive cell design, bridge 64 may be comprised of portions of anode current collectors 46.

As shown in FIG. 7, a lead 66 is electrically connected to the series of current collector tabs 56 that comprise bridge 64. Lead 66 is preferably composed of a first metal, most preferably aluminum or titanium. As FIG. 7 illustrates, a portion of the terminal pin 30 is joined to lead 66 using the present magnetic pulse welding method, thereby creating an electrical connection between the electrode assembly 34 and terminal pin 30. It is contemplated that terminal pin 30 may be joined directly to bridge 64 using the magnetic pulse welding method of the present invention.

Figure 8:
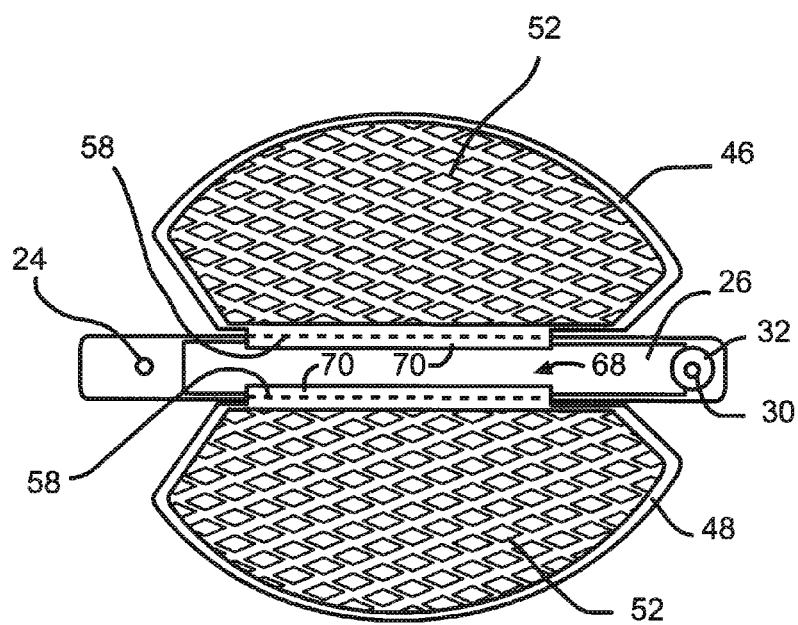
FIG. 8 is a top view of an embodiment of current collectors 46, 48 joined to a lid 26 using the present magnetic pulse welding invention.

The magnetic pulse welding technique may also be used to directly attach the anode and/or cathode current collector 46, 48 to the lid 26. As illustrated in FIG. 8, two current collectors 46, 48 are directly attached to a top surface 68 of the lid 26. More specifically, a current collector extension 70 comprising a land of metal extends from the end of the current collector 46, 48. As shown, the current collector extension is welded to the top surface 68 of the lid 26 thereby creating a hinged relationship between the current collector 46, 48 and the lid 26.

FIGS. 9A-9D, illustrate various embodiments of a magnetic pulse welding instrument 72. The instrument generally comprises a coil 74 composed of an electrically conductive material, such as a metal, that is electrically connected to an electrical power source 76. In a preferred embodiment, the power source 76 comprises a capacitor 78 or plurality of capacitors 78 that are electrically connected to an electrical ground 82. In a preferred embodiment, the capacitor(s) 78 generate a direct electrical current 80 that is applied to the coil 74. As illustrated, in FIGS. 9A, 9B and 9D, the current 80 generally flows in the direction towards the capacitor 78 and away from the ground 82.

In addition, the power source 76 may also comprise a pulse trigger 84 that enables application of discrete bursts or pulses of direct electrical current to the coil 74. Preferably, direct electrical current 80 is applied to the coil 74 at a relatively high pulse frequency. In an embodiment, the direct electrical current 80 can be applied intermittently to the coil 74 at interval durations lasting between 10 μs to about 100 μs and/or at an oscillating period from about 10 μs to about 50 υs. In a preferred embodiment, direct electrical current 80 may be applied to the coil 74 at a frequency rate ranging from about 1 kHz to about 100 kHz.

In addition, it is preferred that the amperage of the direct current being applied to the coil 74 range from about 1 kA to about 200 kA. It is also preferred that the coil 74 be designed such that electrical current 80 travels in one direction therethrough. As shown in FIGS. 9A, 9B, and 9D, direct electrical current 80 enters the coil 74 at a first location and exits the coil 74 at a second location that is different from the first.

The coil 74 may be constructed in a number of different shapes and geometries. As illustrated in FIGS. 9A and 11A, the coil structure 74 may comprise a single coil layer. In addition, the coil 74 shown in FIGS. 9A and 11A is formed in a shape that is similar to the letter "E". As illustrated, coil 74 comprises left and right coil portions 86, 88 and a central coil portion 90 residing therebetween. Each of the coil portions 86, 88, and 90 is connected such that direct electrical current 80 flows through the coil structure 74 in one direction. For example, as shown in FIG. 9A, electrical current 80 is shown flowing into coil leg portion 90 and flows out of the coil structure 74 through the left and right coil leg portions 86, 88. The "E" like structure of the coil structure 74 shown in FIGS. 9A and 11A, is preferred because it facilitates circumferential flow of the magnetic field 100 about the coil 74. For example, the magnetic field can move in a circumferential direction about an exterior surface of individual leg portions 86, 88 and 90.

Alternatively, the coil 74 may be constructed comprising two layers as illustrated in FIG. 9B. In this construction, the coil 74 comprises a bottom layer 92 and a top layer 94 that oppose each other and are joined together by central portion 95. As illustrated, electrical current 80 flows into the top coil layer 94 through central portion 95 and out the bottom coil layer 92.

Figure 10:
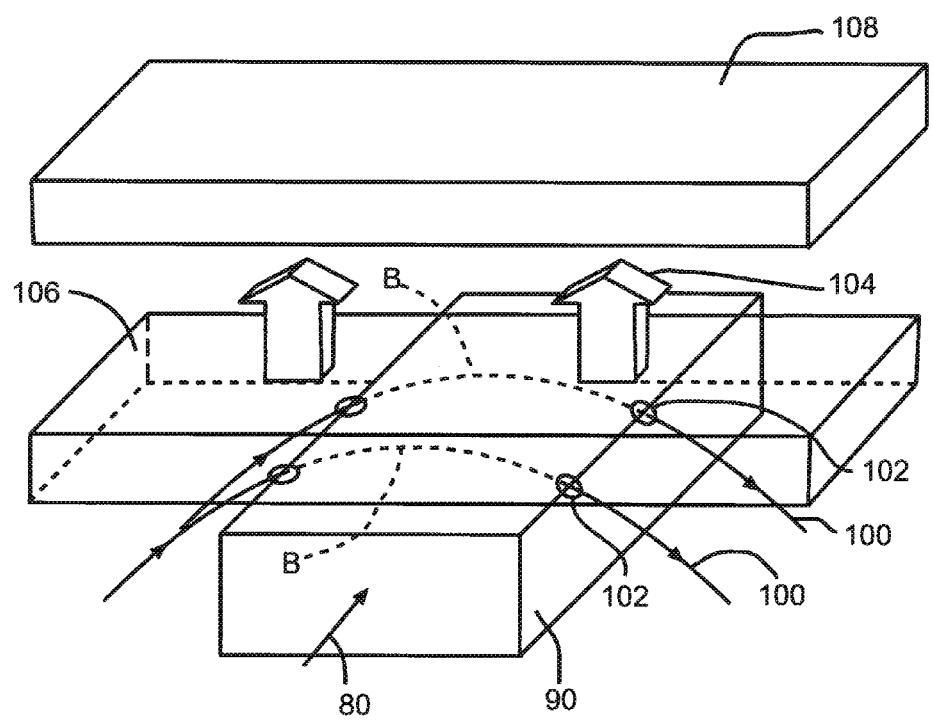
FIG. 10 illustrates an embodiment of an electro-magnetic force generated by the inaction of an eddy current and a magnetic field flux acting on a work piece.

FIG. 9C illustrates a top view of the two-layer coil construction 74 shown in FIG. 9B. As shown, the top coil layer 94 may comprise a "dog bone" shaped construction that aids the flow of the magnetic field around the work pieces. For example, as shown in FIG. 10, the magnetic field 100 is illustrated as flowing circumferentially about the exterior of central coil portion 90. Because of its narrower central coil portion, this coil 74 embodiment is often referred to as an "H" coil 74.

Furthermore, as illustrated in FIG. 9D, the coil 74 may be comprised of a one-piece cylindrical construction. As illustrated in FIG. 9D, the coil 74 is constructed similar to that of a cylindrical tube having an elongated perimeter wall and a lumen extending therewithin such that working pieces may be positioned within the cylindrical coil 74. As shown, direct electrical current 80 enters the coil at a first location 96 and travels through the coil 74 until it reaches a second coil location 98 at which the current 80 exists the coil 74.

FIG. 10 illustrates a magnified view of the principle of magnetic pulse welding. As shown in FIG. 10, movement of the direct electrical current 80 within the electrically conductive coil 74 induces a magnetic field 100 about the exterior of the coil 74. The magnetic field 100 travels circumferentially about the exterior surface of a section of the coil 74 (FIGS. 9A to 9D) in a clockwise direction. In the presence of a first metallic work piece 106, positioned within or adjacent the coil 74, the magnetic field 100 in turn induces an eddy current 102 which propagates through the surface of the work piece 106. Interaction of the eddy current 102 within the magnetic field 100 further induces an electro-magnetic force 104 that acts in a direction perpendicular to the magnetic field 100. More specifically, the electro-magnetic force 104 acts in a direction that is away and perpendicular from the magnetic field 100.

When an intermittent direct electrical current 80 is applied to the coil 74, a magnetic field flux (B) is generated that penetrates through the work piece 106 adjacent, and most proximate, the energized coil 74. Interaction of the metallic work piece 106 with the magnetic field flux (B), further creates an eddy current 102 that travels through the surface of the electrically conductive work piece positioned proximate the energized coil 74.

Creation of the electro-magnetic force 104 is in accordance with John Fleming's left-hand rule, which states that when electrical current flows in an electrically conductive material, and an external magnetic field is applied across the flow, the electrically conductive material experiences a force perpendicular to both the magnetic field and the direction of the electrical current. Thus, an electro-magnetic force 104 (F), proportional to the eddy current 102 (I) within the surface of the work piece 106 and the magnetic field flux (B) about the work piece, is generated (F=I×B). As shown in FIG. 10, the electro-magnetic force 104 acts perpendicular and away from the magnetic field 100 that flows about the exterior of the coil 74.

The phenomena occurring during magnetic pulse welding is generally given by the following equations:

$$\nabla \times i = -K\left(\frac{\partial B}{\partial t}\right) \quad \text{(Eq. 1)}$$

$$F = \frac{(B_o^2 - B_i^2)}{2\mu} = \left(\frac{B_o^2}{2\mu}\right)(1 - e^{-2x/\delta}) \text{ and } \delta = \sqrt{2/\omega K \mu} \quad \text{(Eq. 2)}$$

Where $\nabla$ equals the divergence of a tensor field, i equals the eddy current density, K equals the electrical conductivity, $\mu$ equals the magnetic permeability, $B_o$ is the magnetic flux density at the lower surface of the work piece proximal to the coil, $B_i$ is the magnetic flux density at the upper surface of the work piece proximal to the coil, t is the thickness of the first metal, F equals the magnitude of the electro-magnetic force and $\omega$ is the angular frequency of the changing magnetic field.

As shown in FIG. 10, it is the electro-magnetic force 104 that physically moves at least a portion of the work piece 106, proximate the coil surface, in a direction away from the coil surface. Furthermore, it is this electro-magnetic force 104 that physically moves at least a portion of the work piece 106, proximate the coil 74, into another second work piece 108, thus causing a collision between the two work pieces and thereby creating a weld therebetween.

FIGS. 11A, 11B and 11C illustrate embodiments in which work pieces 106, 108 may be positioned within the magnetic force welding instrument 72. In one embodiment, illustrated in FIG. 11A, a first metal 106 and a second metal 108 are positioned adjacent an energized first coil surface 110. More specifically, the exterior surface of the first metal 106 is positioned such that it may be in physical contact with the first coil surface 110. The second metal 108 is positioned adjacent the first metal 106. The first metal 106 is positioned proximate the first coil surface 110 and the second metal 108 is positioned distal the first coil surface 110. In addition, the first metal 106 or "flyer metal", is positioned such that it is capable of moving. On the other hand, the second metal 108 or "parent metal", is positioned such that it is stationary and not capable of moving within the weld fixture.

Similarly, FIG. 11B illustrates a two-layer coil embodiment in which the first and second metals 106, 108 are positioned adjacent the top coil portion 94. More specifically, the first metal 106 is positioned in physical contact with the energized first coil surface 110. The second metal is positioned adjacent the first metal 106 and distal of the first coil surface 110.

In an additional embodiment, as shown in FIG. 11C, the first and second metals 106, 108, may be positioned between electrically energized top and bottom opposing portions 94, 92. In this embodiment, both the top and bottom coil portions 94, 92 are electrically energized, thus providing two opposing magnetic fields 100 with respect to the first and second metals 106, 108. In addition, eddy currents 102 are induced in each of the first and second metals 106, 108. Therefore, top and bottom electro-magnetic forces 104 are formed which provide forces with which to move the opposing metals 106, 108 such that they come together and collide, thereby creating a weld joint therebetween.

Furthermore, in an embodiment illustrated in FIGS. 11A, 11B, 11C, and 11D a gap of space 112 preferably resides between adjacent first and second metals 106, 108. This gap of space 112, which may range from about 0.5 μm to about 5 cm, provides a space for the first metal 106 to accelerate within before impacting the opposing exterior surface of the second metal 108. In a preferred embodiment, at least one insulator body 114 may be positioned between the adjacent exterior surfaces of the first and second metals 106, 108. The insulator body 114 is preferred because the material does not interact with the magnetic field 100 that is generated. Furthermore, if desired, an insulation layer (not shown) may be positioned between the first metal 106 and the coil surface 110. In addition, a fixture clamp 116 may also be used to secure the work pieces in place at their appropriate positions to produce a proper magnetic pulse weld connection. The fixture clamp 116 may be positioned above and/or below the coil 74.

In a preferred embodiment, the work piece that is positioned proximate the first energized coil surface 110, such as the first metal 106, may comprises an electrical conductivity that is greater than the second work piece, such as the second metal 108. This is because positioning the work piece with the greater electrical conductivity proximate the energized coil surface 110, generally increases strength of the eddy current 102 therewithin and thus, generally increases the electro-magnetic force 104.

Figure 11D:
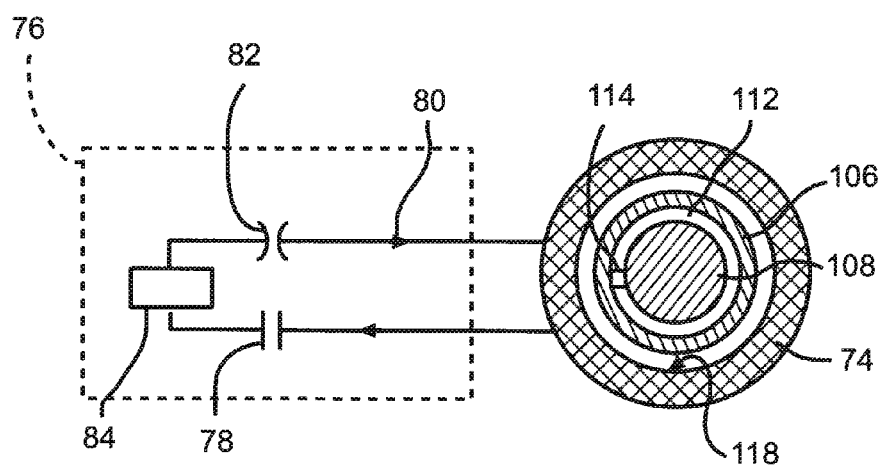
FIG. 11D shows a top view of an embodiment of a setup of the magnetic pulse welding instrument shown in FIG. 9D with two work pieces positioned within the cylindrical coil.

In yet a further embodiment, shown in FIG. 11D, the first and second metals 106, 108 may be positioned within a coil 74 that is cylindrically shaped. In this embodiment, the work pieces 106, 108 are positioned within the coil such that the coil 74 circumferentially surrounds them. As shown, first metal 106 is positioned most proximate an interior surface 118 of the cylindrically shaped coil 74.

In a preferred embodiment, this coil configuration is designed for work pieces having a curved or round cross-section. For example, an outer tubular metal may be joined to a second tube or an elongated body having a smaller diameter. Similarly to the previous embodiments, a dielectric body 114 may be positioned between the surfaces of the first and second metals 106, 108 thus creating a gap of space 112 therebetween.

Just as with the other welding embodiments previously discussed, when the power supply 76 is energized, the applied direct electrical current 80 travels through the coil 74, generating the magnetic field 100 circumferentially about an exterior space of the coil 74. The interaction of the magnetic field 100 with the work piece thus creates flow of eddy current 102 within the work piece which in turn, induces the electro-magnetic force 104 acting perpendicularly and away from the magnetic field 100. The electro-magnetic force 104 acts on the first metal 106, thereby, physically moving the first metal 106 and accelerating it across the gap of space 112. After having traveled across the gap of space 112, the first metal 106 collides with the surface of the second metal 108 creating a bond therebetween.

For purposes of illustration, the first metal 106 is referred to herein as the work piece that is positioned most proximal to the first coil surface 110. The second metal 108 is referred to as the work piece positioned adjacent the first metal 106 and distal from the first coil surface 110 in comparison to the position of the first metal 106 within the pulse welding fixture. However, in operation, the position of the first and second metals 106, 108 may be reversed.

In addition, the term "work piece" is defined herein, as a metal material that is acted upon during the pulse welding process. A work piece may comprise the first or second metal 106, 108, such as that of at least a portion of a component in an electrochemical cell 10 that is positioned within a fixture of the magnetic pulse welding instrument 72.

In addition, the work piece that moves and physically impacts another work piece is often referred to as a "flyer metal". The work piece that is impacted is generally referred to as the "parent metal". As defined herein, the term "flyer metal" is the portion of metal that physically moves and impacts another metal. Generally, a first metal 106 positioned most proximal an energized portion of coil 74, impacts a second metal 108. However, the second metal 108 may be the "flyer" metal if it is positioned proximal an energized coil surface. The term "parent metal" is defined herein as the portion of metal that remains stationary throughout the magnetic pulse welding process. The parent metal is impacted by the "flyer" metal during the magnetic pulse welding process.

FIGS. 12A-12E illustrate various embodiments of materials comprised of different geometries that can be joined together utilizing the magnetic pulse welding technique of the present invention. FIG. 12A illustrates an embodiment of the magnetic pulse weld connection of a first metal 106 having a curved cross-section, such as a rod or terminal pin 30, to that of a second metal 108, having a rectangular cross-section, such as a tab 50 or current collector 46, 48. As shown in the embodiment illustrated in FIG. 12A, the weld area 58 extends across a width of the planar surface of the second metal 108.

FIG. 12B illustrates a top view of the magnetic pulse weld connection shown in FIG. 12A. As shown the second metal 108 comprising the rectangular cross-section, conforms to the curved exterior surface 106A of the first metal 106 comprising the curved cross-section. The planar surface 108A of the second metal forms a weld area 58, which deforms from its originally planar shape to follow the contour of the exterior surface of the curved first metal 106.

FIGS. 12C and 12D illustrate an embodiment of the direct magnetic pulse weld connection between first and second metals 106, 108 having respective planar surfaces. For example, this embodiment may represent the connection between the tab 50 and the current collector 46, 48. More specifically, a magnetic pulse weld connection between a first end of tab 50 to a side edge of a perimeter of a current collector 46, 48. As shown in FIG. 12C, the weld area 58 extends across the width of second metal 108. FIG. 12D illustrates a cross-sectional view taken from the side of the weld connection shown in FIG. 12C. As shown, the weld connection is formed at a portion of the interface between the exterior surfaces of the first and second metals 106, 108.

FIG. 12E illustrates a cross-sectional view taken from the side of first metal 106 comprising a tubular body and having a frusto-conical end joined, such as an end of a coupler 60, to a second metal 108 having a curved cross-section, such as a terminal pin 30, using the magnetic pulse welding process of the present invention. These embodiments shown in FIGS. 12A-12E illustrate the wide variety of geometries in which metals of similar as well as dissimilar material compositions can be directly welded together.

Figure 13:
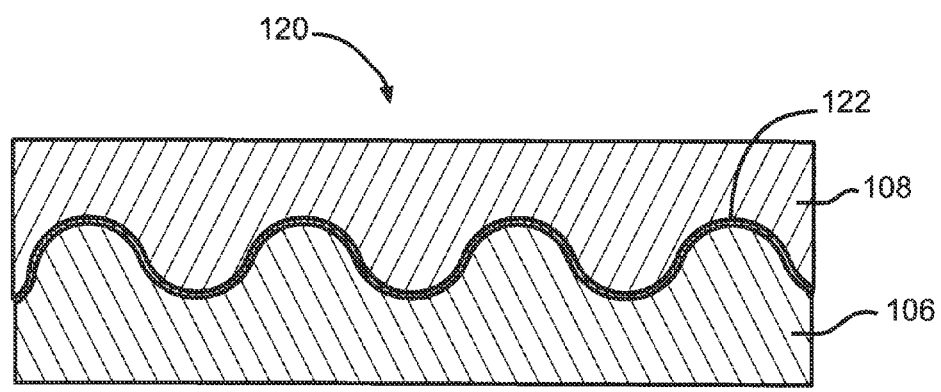
FIG. 13 shows an embodiment of a magnified cross-sectional view of a collision impact zone created by a magnetic pulse weld connection.

FIG. 13 illustrates a magnified embodiment of a weld zone or collision impact zone 120 formed within the weld area 58. As shown, the impaction of the first metal 106 with that of the second metal 108 creates a boundary line 122, which delineates the two metals 106, 108. However, unlike other welding techniques, such as laser welding or electrical resistance welding, the fraction of a second from coil energization to work piece impact created by the magnetic pulse welding, does not allow for the creation of a heat affected zone (HAZ) as is typical with respect to the other welding techniques. As a result of a minimized or eliminated heat affected zone, extensive inter-metallic bonds are not formed. Formation of inter-metallic bonds is generally not desired as they tend to form a relatively brittle interface. Therefore, by minimizing the formation of inter-metallic bonds within the weld zone, the joined metals are generally more durable and robust.

It is noted however, that although the example of the boundary line 122 illustrated in FIG. 13, is shown to be similar to a sinusoidal wave, the boundary line 122, may have a different appearance. For example, the boundary line 122 may have an alternate wave appearance, or may appear similar to a straight line, or may have a meandering line appearance. In either case, the impaction zone 120 generally comprises a boundary line 122 which delineates the first metal 106 from the second metal 108.

Metallic bonds formed by magnetic pulse welding are generally characterized as having an increased surface hardness as compared to their initial non-welded surfaces. This is because the higher hardness at the interface can generally result from the intense plastic deformation that occurs due to the high velocity collision or, alternatively, to a fine grain microstructure which may form during rapid solidification of the welded interface at the impact zone 118. For example, velocities of the first 106 or "flying" metal may range from about 75 m/s to as much as 150 m/s or greater. The resulting impaction force may range from about 0.5 GPa to about 1.0 GPa depending on the composition of the first and second metals 106, 108 as well as the strength of the magnetic field generated.

In a preferred embodiment, the first and second metals 106, 108 may be of a different composition having dissimilar properties, or alternatively, they may be composed of a similar composition. Examples of materials that may be joined together using the magnetic pulse welding process may comprise aluminum, molybdenum, titanium, nickel, steel, stainless steel, niobium, copper, gold, silver, palladium, molybdenum, tantalum, tungsten, and combinations thereof.

A first metal 106, for example, comprising an aluminum current collector 46, 48, may have a lower melting temperature than that of a second metal 108, for example, a molybdenum terminal pin 30. Furthermore, the first and second metals 106, 108 may have a difference in melting temperature that is greater than 125° C., more preferably greater than 250° C. and most preferably greater than 500° C. Examples of first metals include, but are not limited to, aluminum (melting temperature 660° C.), titanium (melting temperature 1,725° C.), nickel (melting temperature 1,453° C.), steel (melting temperature 1,130° C.), stainless steel (melting temperature 1,353° C.), niobium (melting temperature 2,468° C.), copper (melting temperature 1,083° C.), gold (melting temperature 1,064° C.), silver (melting temperature 961° C.), palladium (melting temperature 1,554° C.), and combinations thereof. Examples of second metals include, but are not limited to, molybdenum (melting temperature 2,617° C.), tantalum (melting temperature 2,996° C.), tungsten (melting temperature 3,410° C.), and combinations thereof. It is contemplated that any or a combination of first metals 106 may be joined together with a second metal 108 as described in the present invention. It is preferred that the current collectors 46, 48 including the tab 50 of the cathode current collector 48 be composed of a first metal 106 and that the terminal pin 30 be composed of a second metal 108.

As previously mentioned, the present invention is applicable to either primary or secondary electrochemical cells. A primary electrochemical cell that possesses sufficient energy density and discharge capacity for the rigorous requirements of implantable medical devices comprises a lithium anode or its alloys, for example, Li—Si, Li—Al, Li—B and Li—Si—B. The form of the anode may vary, but preferably it is of a thin sheet or foil pressed or rolled on a metallic anode current collector 46.

The cathode of a primary cell is of electrically conductive material, preferably a solid material. The solid cathode may comprise a metal element, a metal oxide, a mixed metal oxide and a metal sulfide, and combinations thereof. A preferred cathode active material is selected from the group consisting of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

Before fabrication into an electrode for incorporation into an electrochemical cell 10, the cathode active material is mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

The cathode component 40, 42 may be prepared by rolling, spreading or pressing the cathode active mixture onto a suitable cathode current collector 48. Cathodes prepared as described are preferably in the form of a strip wound with a corresponding strip of anode material in a structure similar to a "jellyroll" or a flat-folded electrode stack, such as that illustrated in FIG. 6.

In order to prevent internal short circuit conditions, the cathode electrode 40, 42 is separated from the anode electrode 36, 38 by the separator membrane 44. The separator membrane 44 is preferably made of a fabric woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

A primary electrochemical cell includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell is 0.8M to 1.5M LiAsF$_6$ or LiPF$_6$ dissolved in a 50:50 mixture, by volume, of PC as the preferred high permittivity solvent and DME as the preferred low viscosity solvent.

By way of example, in an illustrative case negative primary cell, the active material of cathode body is silver vanadium oxide as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

In secondary electrochemical systems, the anode electrode 42, 44 comprises a material capable of intercalating and de-intercalating the alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless of the form of the carbon, fibers of the carbonaceous material are particularly advantageous because they have excellent mechanical properties that permit them to be fabricated into rigid electrodes capable of withstanding degradation during repeated charge/discharge cycling.

The cathode electrode 40, 42 of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include LiNiO$_2$, LiMn$_2$O$_4$, LiCoO$_2$, LiCo$_{0.92}$Sn$_{0.08}$O$_2$ and LiCo$_{1-x}$Ni$_x$O$_2$.

The lithiated active material is preferably mixed with a conductive additive selected from acetylene black, carbon black, graphite, and powdered metals of nickel, aluminum, titanium and stainless steel. The electrode further comprises a fluoro-resin binder, preferably in a powder form, such as PTFE, PVDF, ETFE, polyamides and polyimides, and mixtures thereof. The current collector 46, 48 is selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC) and ethyl propyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode or counter electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto.

Now, it is therefore apparent that the present invention has many features among which are reduced manufacturing cost and construction complexity. While embodiments of the present invention have been described in detail, that is for the purpose of illustration, not limitation.

What is claimed is:

1. An electrochemical cell, comprising:
    a) a casing;
    b) an electrode assembly contained inside the casing, the electrode assembly comprising:
        i) a first electrode comprising a first current collector supporting a first electrode active material;
        ii) a second electrode comprising a second current collector supporting a second electrode active material;
        iii) a separator disposed between the first and second electrodes to prevent them from physically contacting each other, but providing for ionic conduction therebetween,
        iv) wherein at least one of the first and second current collectors includes a coupler having a tubular portion extending outwardly beyond a perimeter of the current collector, and wherein the coupler is of a first metal and the tubular portion has an inner surface of a first inner diameter; and
    c) an electrolyte contained in the casing to activate the electrode assembly; and
    d) a terminal pin of a second metal extending from a proximal pin portion to a distal pin portion,
    e) wherein with the proximal pin portion received inside the tubular portion of the coupler, a gap resides between the inner surface having the first inner diameter and an outer surface of the proximal pin portion,
    f) wherein the tubular portion is characterized as having been subjected to a magnetic pulse welding force so that a distal segment of the tubular coupler portion assumes a second inner diameter that is in direct physical contact with the outer surface of the proximal pin portion, but with a proximal segment of the tubular portion remaining at the first inner diameter greater than the second inner diameter, and
    g) wherein the distal pin portion extends outside the casing with the terminal pin being in a non-conductive relationship with the casing.

2. The electrochemical cell of claim 1 wherein the first metal of the at least one of the first and second current collectors and the second metal of the terminal pin have a difference in melting temperature of at least about 125° C.

3. The electrochemical cell of claim 1 wherein the first metal of the at least one of the first and second current collectors and the second metal of the terminal pin have a difference in melting temperature of at least about 500° C.

4. The electrochemical cell of claim 1 wherein a heat affected zone is not present where the distal segment of the coupler having the second inner diameter is in direct physical contact with the outer surface of the proximal pin portion.

5. The electrochemical cell of claim 1 wherein the direct physical contact of the distal segment of the tubular coupler portion of the current collector with the outer surface of the proximal pin portion comprises a collision impact zone having a boundary line that separates the first metal of the tubular coupler from the second metal of the terminal pin.

6. The electrochemical cell of claim 1 wherein the first metal of the tubular coupler of the one of the first and second current collectors is selected from the group consisting of aluminum, titanium, nickel, steel, stainless steel, niobium, copper, gold, silver, platinum, palladium, and combinations thereof.

7. The electrochemical cell of claim 1 wherein the second metal of the terminal pin is selected from the group consisting of molybdenum, tantalum, tungsten, and combinations thereof.

8. The electrochemical cell of claim 1 wherein one of the first and second active materials of the respective first and second electrode is selected from the group consisting of lithium, lithium alloys, lithium silver, lithium aluminum, lithium boron, lithium silver boron, carbon, and combinations thereof.

9. The electrochemical cell of claim 1 wherein one of the first and second active materials of the respective first and second electrode is selected from the group consisting of silver vanadium oxide, copper silver vanadium oxide, manganese dioxide, cobalt nickel, nickel oxide, copper oxide, copper sulfide, iron disulfide, titanium disulfide, copper vanadium oxide, lithium nickel oxide, lithium manganese oxide, lithium cobalt oxide, lithium cobalt tin oxide, lithium cobalt nickel oxide, and mixtures thereof.

10. The electrochemical cell of claim 1 wherein the electrolyte comprises a nonaqueous solvent and an ionically conductive salt dissolved therein.

11. The electrochemical cell of claim 1 being of a primary or a secondary chemistry.

12. An electrochemical cell, comprising:
 a) a casing;
 b) an electrode assembly contained inside the casing, the electrode assembly comprising:
  i) an anode comprising an anode current collector supporting an anode active material;
  ii) a cathode comprising a cathode current collector supporting a cathode active material;
  iii) a separator disposed between the anode and cathode to prevent them from physically contacting each other, but providing for ionic conduction therebetween,
  iv) wherein the cathode current collector includes a coupler having a tubular portion extending outwardly beyond a perimeter of the cathode current collector, and wherein the coupler is of a first metal and the tubular portion has an inner surface of a first inner diameter; and
 c) an electrolyte contained in the casing to activate the electrode assembly; and
 d) a terminal pin of a second metal extending from a proximal pin portion to a distal pin portion,
 e) wherein with the proximal pin portion received inside the tubular portion of the coupler, a gap resides between the inner surface having the first inner diameter and an outer surface of the proximal pin portion,
 f) wherein the tubular portion is characterized as having been subjected to a magnetic pulse welding force so that a distal segment of the tubular coupler portion assumes a second inner diameter that is in direct physical contact with the outer surface of the proximal pin portion, but with a proximal segment of the tubular portion closer to the current collector perimeter remaining at the first inner diameter greater than the second inner diameter, and
 g) wherein the distal pin portion extends outside the casing with the terminal pin being in a non-conductive relationship with the casing.

13. The electrochemical cell of claim 12 wherein the anode active material comprises lithium and the cathode active material comprises silver vanadium oxide.

14. The electrochemical cell of claim 12 wherein the first metal of the coupler for the cathode current collector and the second metal of the terminal pin have a difference in melting temperature of at least about 125° C.

15. The electrochemical cell of claim 12 wherein the first metal of the coupler for the cathode current collector and the second metal of the terminal pin have a difference in melting temperature of at least about 500° C.

16. The electrochemical cell of claim 12 wherein a heat affected zone is not present where the distal portion of the coupler having the second inner diameter is in direct physical contact with the outer surface of the proximal pin portion.

17. The electrochemical cell of claim 12 wherein the direct physical contact of the distal segment of the tubular coupler portion of the cathode current collector with the outer surface of the proximal pin portion comprises a collision impact zone having a boundary line that separates the first metal of the tubular coupler from the second metal of the terminal pin.

18. The electrochemical cell of claim 12 wherein the first metal of the tubular coupler of the cathode current collector is selected from the group consisting of aluminum, titanium, nickel, steel, stainless steel, niobium, copper, gold, silver, platinum, palladium, and combinations thereof.

19. The electrochemical cell of claim 12 wherein the second metal of the terminal pin is selected from the group consisting of molybdenum, tantalum, tungsten, and combinations thereof.

20. The electrochemical cell of claim 12 wherein the anode active material is selected from the group consisting of lithium, lithium alloys, lithium silver, lithium aluminum, lithium boron, lithium silver boron, carbon, and combinations thereof.

21. The electrochemical cell of claim 12 wherein the cathode active material is selected from the group consisting of silver vanadium oxide, copper silver vanadium oxide, manganese dioxide, cobalt nickel, nickel oxide, copper oxide, copper sulfide, iron disulfide, titanium disulfide, copper vanadium oxide, lithium nickel oxide, lithium manganese oxide, lithium cobalt oxide, lithium cobalt tin oxide, lithium cobalt nickel oxide, and mixtures thereof.

22. The electrochemical cell of claim 12 wherein the electrolyte comprises a nonaqueous solvent and an ionically conductive salt dissolved therein.

23. The electrochemical cell of claim 12 being of a primary or a secondary chemistry.

24. A method for manufacturing an electrochemical cell, comprising the steps of:
 a) providing a casing container having a opening leading therein;

b) providing an electrode assembly, comprising the steps of:
  i) supporting an anode active material on an anode current collector to provide an anode;
  ii) supporting a cathode active material on a cathode current collector to provide a cathode;
  iii) disposing a separator between the anode and cathode to prevent them from physically contacting each other, but providing for ionic conduction therebetween,
  iv) wherein at least one of the anode and cathode current collector includes a coupler having a tubular portion extending outwardly beyond a perimeter of the respective anode and cathode current collector, and wherein the coupler is of a first metal and the tubular portion has an inner surface of a first inner diameter; and
c) housing the electrode assembly in the casing container and closing the container opening with a lid to thereby provide a casing;
d) filling an electrolyte into the casing to activate the electrode assembly; and
e) supporting a feedthrough in the casing so that a terminal pin of the feedthrough is in a non-conductive relationship with the casing, wherein the terminal pin is of a second metal and extends from a proximal pin portion residing inside the casing to a distal pin portion extending outside thereof;
f) positioning the proximal pin portion inside the tubular portion of the coupler with a gap residing between the inner surface having the first inner diameter and an outer surface of the proximal pin portion;
g) subjecting the tubular portion of the coupler to a magnetic pulse welding force so that a distal segment of the tubular coupler portion assumes a second inner diameter that is in direct physical contact with the outer surface of the proximal pin portion, but with a proximal segment of the tubular portion remaining at the first inner diameter greater than the second inner diameter; and
h) connecting the other of the anode and cathode not connected to the terminal pin by the coupler to a second, opposite polarity terminal.

25. The method of claim 24 including connecting the terminal pin to the cathode current collector of the cathode and connecting the second, opposite polarity terminal to the anode.

26. The method of claim 24 including providing the first metal of the cathode current collector and the second metal of the terminal pin having a difference in melting temperature of at least about 125° C.

27. The method of claim 24 including providing the first metal of the cathode current collector and the second metal of the terminal pin having a difference in melting temperature of at least about 500° C.

28. The method of claim 24 including providing the direct physical contact of the distal segment of the tubular coupler portion of the cathode current collector with the outer surface of the proximal pin portion comprising a collision impact zone having a boundary line that separates the first metal of the tubular coupler from the second metal of the terminal pin.

29. The method of claim 24 including selecting the first metal of the tubular coupler of the cathode current collector from the group consisting of aluminum, titanium, nickel, steel, stainless steel, niobium, copper, gold, silver, platinum, palladium, and combinations thereof.

30. The method of claim 24 including selecting the second metal of the terminal pin from the group consisting of molybdenum, tantalum, tungsten, and combinations thereof.

31. The method of claim 24 including selecting the anode active material from the group consisting of lithium, lithium alloys, lithium silver, lithium aluminum, lithium boron, lithium silver boron, carbon, and combinations thereof.

32. The method of claim 24 including selecting the cathode active material from the group consisting of silver vanadium oxide, copper silver vanadium oxide, manganese dioxide, cobalt nickel, nickel oxide, copper oxide, copper sulfide, iron disulfide, titanium disulfide, copper vanadium oxide, lithium nickel oxide, lithium manganese oxide, lithium cobalt oxide, lithium cobalt tin oxide, lithium cobalt nickel oxide, and mixtures thereof.

* * * * *